United States Patent [19]

Blum et al.

[11] Patent Number: 4,723,376
[45] Date of Patent: Feb. 9, 1988

[54] APPARATUS FOR THE PRODUCTION OF AN OPHTHALMIC LENS

[75] Inventors: Dieter W. Blum; Andrew S. Duncan, both of Regina, Canada

[73] Assignee: Innovative Research Inc., Saskatchewan, Canada

[21] Appl. No.: 934,709

[22] Filed: Nov. 25, 1986

[30] Foreign Application Priority Data

Nov. 25, 1982 [CA] Canada ................................ 496296
Nov. 25, 1985 [CA] Canada ................................ 496069

[51] Int. Cl.⁴ ............................................ B24B 49/12
[52] U.S. Cl. ........................... 51/165.72; 51/101 LG; 51/165.71; 356/376; 356/380
[58] Field of Search ........ 51/165.72, 165.71, 101 LG, 51/105 LG; 356/380, 376

[56] References Cited

U.S. PATENT DOCUMENTS

| | | | |
|---|---|---|---|
| 2,184,156 | 12/1939 | Bowles | 356/380 |
| 2,184,161 | 12/1939 | Stockbarger | 356/380 |
| 4,096,684 | 6/1978 | Okaba | 51/101 LG |
| 4,203,259 | 5/1980 | Haddock | 51/97 NC |
| 4,557,076 | 12/1985 | Helbrecht | 51/101 LG |
| 4,622,462 | 11/1986 | Eaton | 356/376 |
| 4,633,618 | 1/1987 | Kobayashi | 51/101 LG |
| 4,656,590 | 4/1987 | Ace | 51/105 LG |

FOREIGN PATENT DOCUMENTS 454207 4/1970 Japan ................................ 356/380

Primary Examiner—Harold D. Whitehead
Attorney, Agent, or Firm—Bernard, Rothwell & Brown

[57] ABSTRACT

Apparatus for the positional control of the edge grinding of an ophthalmic lens to a desired peripheral shape is effected by a control computer which processes and stores data representative of a pattern which delineates the peripheral shape of the lens. The data is derived by rotating a linear image sensor about an axis passing through a support for a pattern which delineates the required shape. The sensor generates pixel data which is processed and stored by the control computer for use for selective control of a lens periphery grinder.

12 Claims, 7 Drawing Figures

APPARATUS FOR THE PRODUCTION OF AN OPHTHALMIC LENS

This invention relates to apparatus for the production of an ophthalmic lens by positional control of the edge grinding of a lens which is to be edge ground. The invention provides for the processing and storing in a computer of data representative of desired peripheral shapes to which lenses are to be ground and this data is derived by scanning a pattern which delineates the peripheral shape of the lens, for example by scanning from eye glass frames, lenses, or pattern cams.

Ophthalmic lens periphery grinders have been subject to numerical control using electromechanical devices for example a stylus or other similar mechanism which physically contacts and traces the inside peripheral shape of an eye glass frame or the outside peripheral shape of a pattern cam. The stylus is usually mounted in such a way that it is linearly displaced as it traces the peripheral shape and the linear displacement of the stylus is translated into an electrical signal by a suitable transducer. This electrical signal is proportional to the physical position of the stylus and fluctuates in accordance with changes in the peripheral shape being traced. The electrical signal is then digitized by a suitable digitizer for subsequent processing and storage in a control computer.

The digital storage and manipulation of data representative of the two-dimensional peripheral shape can then be used to control and ophthalmic lens periphery grinder of the numerical control type.

Numerical control systems have been employed for the positioning of a workpiece relative to a working tool. The application of this technique to the grinding of the peripheral shapes of ophthalmic lenses is described with reference to a specific lens periphery grinder in U.S. Pat. No. 4,203,259 which discloses apparatus for grinding the peripheries of ophthalmic lenses, which disclosure is itself an advance in the art but does not provide the advantages of the present invention.

Apparatus of this known kind has disadvantages and limitations, namely a slow rate of acquisition of data, low resolution, and mechanical inaccuracies. Also considerable effort by the operator is required because the eye glass frame or pattern cam has to be accurately mounted with respect to an optical axis prior to scanning.

The object of the present invention is to overcome the limitations of the prior apparatus and to provide apparatus for the accurate production of ophthalmic lenses which is easy to operate and has high resolution.

BRIEF SUMMARY OF THE INVENTION

According to the invention there is provided apparatus for the production of an ophthalmic lens by positional control of the edge grinding of a lens, comprising a support for a pattern which delineates the peripheral shape of an ophthalmic lens, a linear image sensor mounted for rotation about an axis passing through the support, and a control computer connected to the sensor to process and store pixel data generated by the rotating sensor for selective control of a lens periphery grinder.

The pattern which delineates the peripheral shape of the ophthalmic lens may be the peripheral shape of an eye glass frame, the periphery of an actual finished lens, or a pattern cam which can be held stationary on the support for viewing by the rotating linear image sensor.

In the preferred embodiment an optical system between the support and the linear image sensor provides an image of the pattern for scanning by the sensor, and the control computer controls rotation of the sensor about its axis during a scanning cycle which results in scanning of the whole of the pattern as the sensor rotates. Pixel data which is generated is digitized and stored in the control computer and is employed as an input in the generation of a positioning signal which is transmitted to a lens periphery grinder for determining the relative positions of a lens blank which is being edge ground and grinding means, usually a grinding wheel.

The invention also comprehends an apparatus for edge grinding of an ophthalmic lens to a desired peripheral shape, comprising a lens periphery grinder including a sensing device for sensing the position of a lens edge relative to grinding means and for producing an actual position signal, and means responsive to a positioning signal from a control computer to determine the relative position of the lens and the grinding means. The control computer may include a comparator which is operable to compare the actual position signal with stored data generated by sensing a pattern which delineates the desired peripheral shape of the lens and produces the positioning signal for transmission to the lens periphery grinder.

The invention thus provides for accurate high resolution and digitization of an image of a pattern cam to produce control which eliminates complicated and difficulted alignment procedures in lens periphery grinders. A large number of data packages may be stored in the control computer resulting from the initial sensing of prototype patterns, and the operator can then readily select from the computer the appropriate pattern data for the lens being ground.

The positional control computer of the invention can be readily attached to one or a plurality of ophthalmic lens periphery grinders for simultaneous operation, and can be employed with a wide variety of ophthalmic lens periphery grinders with increased accuracy of the peripheral shapes of the lenses being ground as well as increased speed of production of the lenses and increased ease of operation, thus obviating the requirement for the storage, retrieval and handling of pattern cams.

The present invention provides an improvement in numerical control apparatus for lens peripheral grinding as well as overcoming disadvantages of the known lens grinding apparatus in which the grinding of the peripheral shape of a lens is effected by following a pattern cam. Such known apparatus has the disadvantage that there may be inaccuracies in the ground peripheral shape of the lens resulting from the use of inaccurate pattern cams.

Also the invention overcomes the need to store a large inventory of pattern cams appropriate to the number of shapes and sizes of lenses to be ground, and does away with the retrieval time associated with an inventory of pattern cams as well as the time and effort required by the operator to change pattern cams on the lens periphery grinder. Also the grinder can be connected to and controlled from the control computer, but can revert to manual operation if desired.

Further the present invention permits higher speed of operation since by employing the invention the actual edge grinding operation is not governed by the limitations of any mechanical sensing technique.

The apparatus of the present invention can be employed with a wide variety of lens periphery grinders which follow a pattern cam.

BRIEF DESCRIPTION OF THE DRAWINGS

An embodiment of the invention will now be described, by way of example, with reference to the accompanying drawings in which.

DETAILED DESCRIPTION

Figure 1:
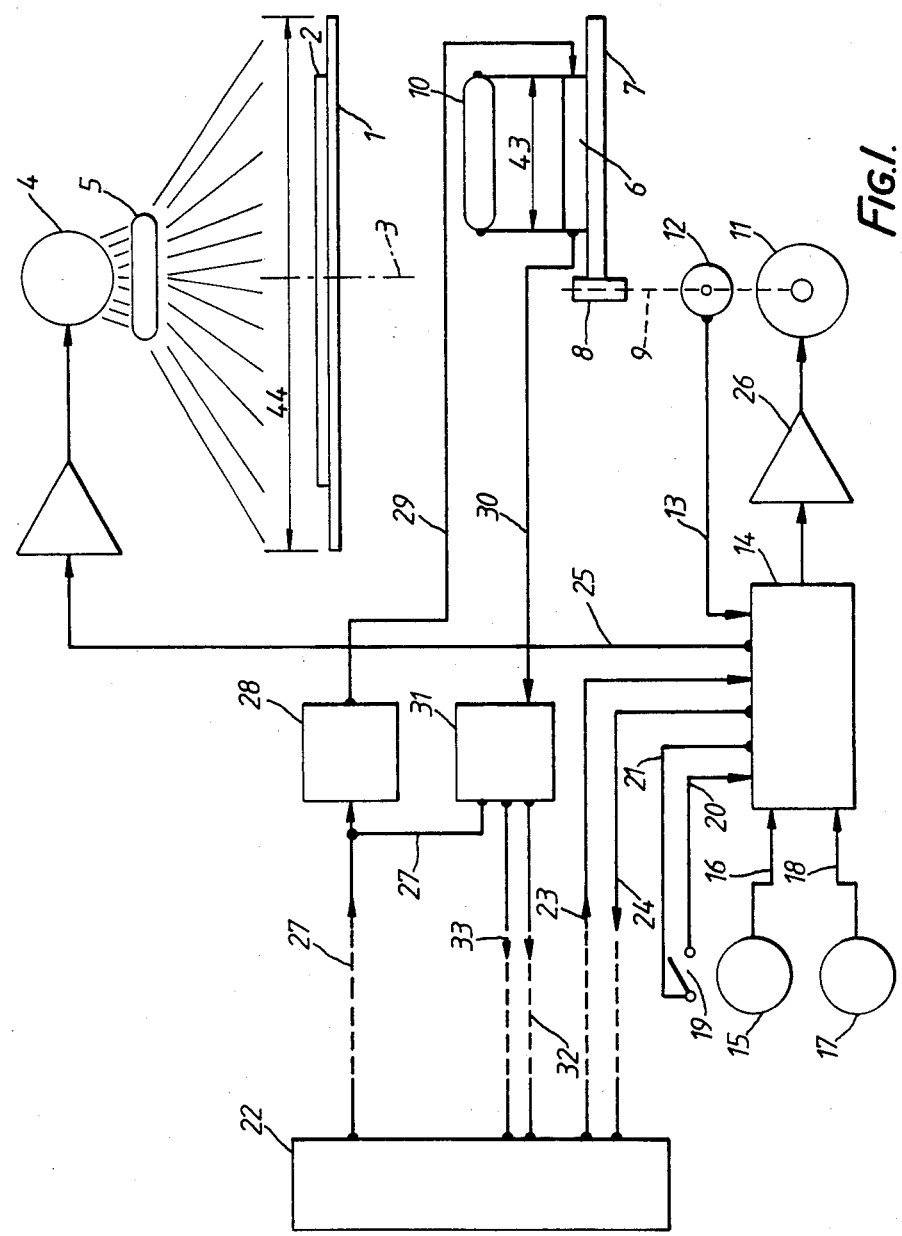
FIG. 1 is a schematic representation in block diagram form of apparatus according to the invention for sensing a pattern which delineates the peripheral shape of an ophthalmic lens and storing pattern data computer.
Figure 5:
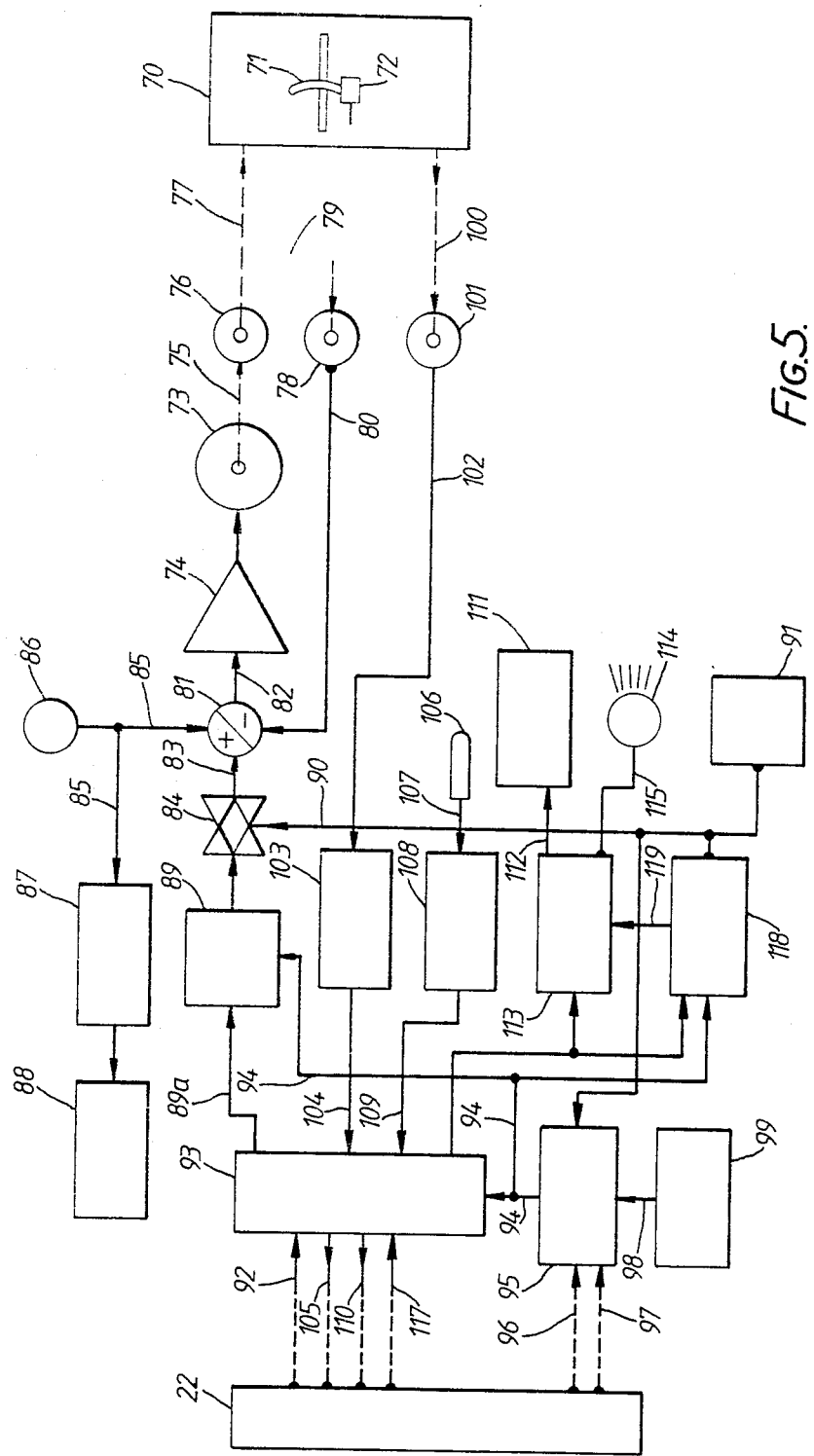
FIG. 5 is a schematic block diagram illustrating the positional control of a lens periphery grinder employing the data stored in the control computer of FIG. 1.

In the block diagrams of FIGS. 1 and 5 some of the units may be in analog or digital form.

Referring to FIG. 1 of the drawings apparatus for the production of an ophthalmic lens by positional control of the edge grinding of a lens comprises a support graticule 1 for a pattern 2 which delineates the peripheral shape of an ophthalmic lens to be edge finished in order to match particular eye glass frames.

Figure 4:
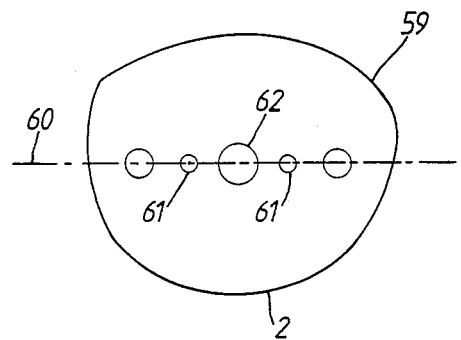
FIG. 4 is an illustration of a pattern cam which delineates the peripheral shape of an ophthalmic lens to be ground and which is employed to generate control data for storage in the control computer.

The pattern 2 is usually a pattern cam of the kind illustrated in FIG. 4. However the pattern 2 may be the sensed inner edge of eye glass frames placed on the support 1 or may be a previously edge finished lens.

The pattern 2 is centralised on the support graticule 1, the central line of which is indicated at 3. A lamp 4 is mounted above the support 1 and illuminates the whole upper face of the support through a diffuser 5 which serves to diffuse the light from the lamp 4 so that it is incident on the whole support area.

Beneath the support graticule a linear image sensor 6 is mounted on a support 7 which is connected at one end to a shaft 8 which rotates about an axis 9 which is collinear with the centre line 3 of the support. The sensor 6 is a charge coupled device linear image sensor, for example the sensor supplied by Texas Instruments Corporation under No. TC101 and is a 1728 by 1 pixel linear image sensor.

The support 7 also carries a lens 10 which is mounted above the sensor.

In the embodiment illustrated the distance from the centre line 3 to an edge of the support graticule 1 is twice the length of the sensor 6 and the lens 10 focuses an image on the sensor 6 of the part of the pattern 2 to one side of the centre line, which image is reduced by a factor of 2. With the support 7 for the sensor 6 offset from the axis 9 the support 7 can be rotated beneath the support graticule 1 by a motor 11 connected to the shaft 8 to provide a complete scan of the pattern cam 2 during a scanning cycle of the sensor beneath the support 1.

The shaft 8 is also connected to a position resolver 12 which provides a position feedback signal on line 13 as the motor rotates the sensor beneath the support 1.

A motor logic circuit 14 controls the direction of rotation of the motor 11 and can also control the speed of rotation of the motor 11 if desired. A clockwise rotation limit device 15 is linked to the motor logic circuit 14 by a line 16 and a counterclockwise rotation limit device 17 is linked to the motor logic circuit 14 by a line 18. These limit devices are normally set to points approximately 370° apart. Actuation of the motor logic circuit 14 is under control of a foot switch 19 which is connected to the circuit 14 by lines 20 and 21. The foot switch is depressed by the operator to initiate scanning.

The motor logic circuit 14 is connected to a control computer 22 which serves to provide data for selective control of positioning in the lens periphery grinder, as will be described with reference to FIG. 5. The connection between the motor logic circuit 14 and the control computer 22 comprises a scan enable line 23 and a scan complete line 24. The motor logic circuit 14 is also connected by a line 25 to a driver 26 for the lamp 4 which illuminates the pattern cam 2.

When a scan enable signal is present on line 23 the motor logic circuit 14 via a control amplifier 26 actuates the motor 11 which rotates the support 7 through 370° below the support graticule 1 under control of the control computer 22 and the limit devices 15 and 17.

When a scan has been completed the motor logic circuit provides a scan complete signal to the computer on line 24.

The computer 22 provides a synchronising master clock signal on a line 27 which is fed through a clock circuit 28 on line 29 to control the scanning operation by the linear image sensor 6.

This clock signal controls the operation of the linear image sensor 6 in synchronism with its rotation about the axis 9.

A data output from the sensor 6 is on line 30 which is connected to a threshold processor 31.

A master clock signal is also fed to the processor 31 which digitizes the analog pixel data from the sensor 6 on line 30. At the end of the transfer of one complete line or slice of 1728 pixels on line 30 the threshold processor 31 transmits an end of line signal to the computer 22 on line 32. The digitized pixel data is transmitted from the processor 31 to the computer 22 on line 33 for further processing and storage.

Figure 3:
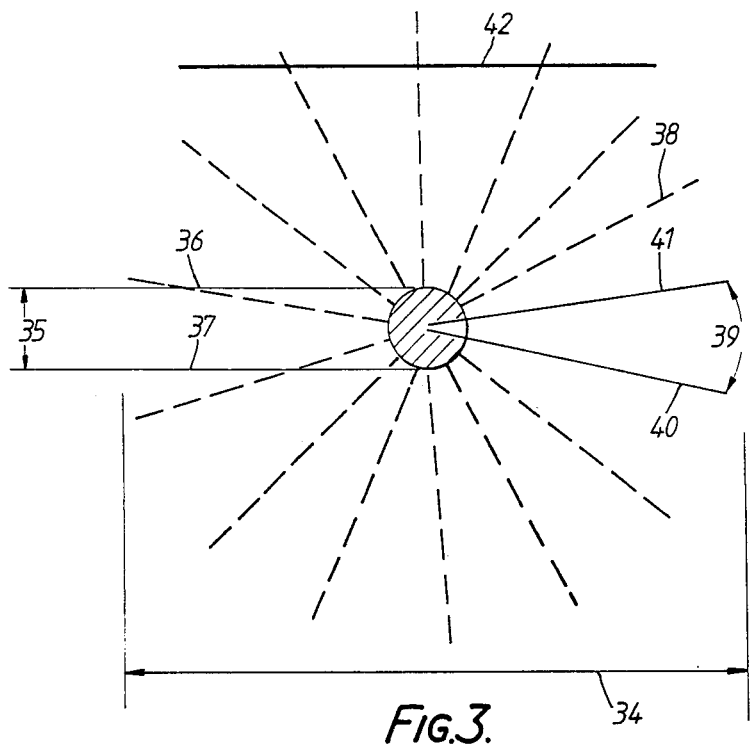
FIG. 3 illustrates the scanning of a pattern in the apparatus of FIG. 1.

FIG. 3 illustrates from above the circular scan effected by the sensor 6 during its rotation. In FIG. 3 the dimension 34 is the diameter of the circular scan and is four times the width of the linear image sensor element 6 in this embodiment.

The dimension 35 is the overlap diameter between two lines 36 and 37 which indicate the overlap of the insides of slices or lines 38 as they are sensed by the sensor 6.

The angular dimension 39 represents the overlap caused by the overscan between scan line 40 which is the first scan line and scan line 41 which is the last scan line. The number of scan lines during a scanning cycle represents the number of slices taken during the scan.

The reference line 42 represents a parallel objective placed near the top of the scan area and intersecting a portion of the scan field for establishing a positional reference for eye glass frames which are abutted against that objective when being used as a pattern.

Thus when the support 7 is rotated circularly by the shaft 8 about its axis 9 the linear image sensor 6 in effect takes multiple slices of the image of the pattern 2 placed on the support graticule 1.

The linear dimension 43 of the sensor 6, FIG. 1, and the dimensions 44 of the support graticule to either side of its centre line 3 indicate that the sensor 6 scans an image of a circular area four times the size of the active dimension of the sensor.

The actual number of slices taken of that image depend on the speed of rotation of the sensor by the motor 11 as well as the clock speed from the computer on line 27 and the maximum linear scan speed of the sensor 6 which is dependant on the characteristics of that charge coupled device linear image sensor and the amount of illuminating light falling on the sensor.

Figure 2A:
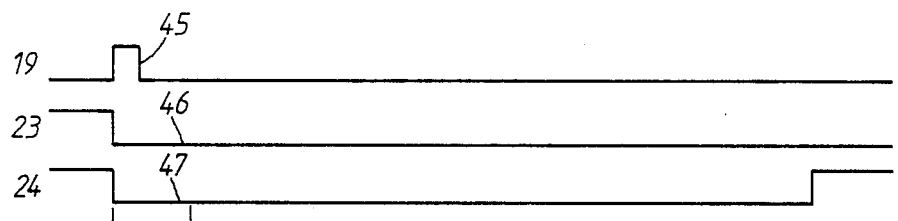
FIGS. 2a, 2b and 2c are waveform diagrams illustrating the operation of the apparatus of FIG. 1.
Figure 2B:
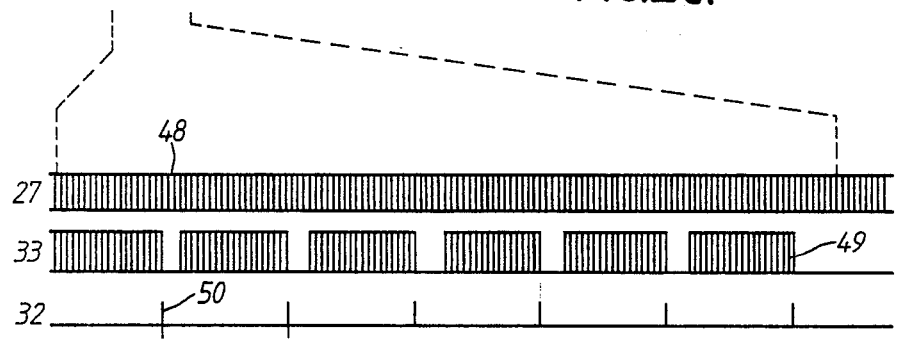
Figure 2C:
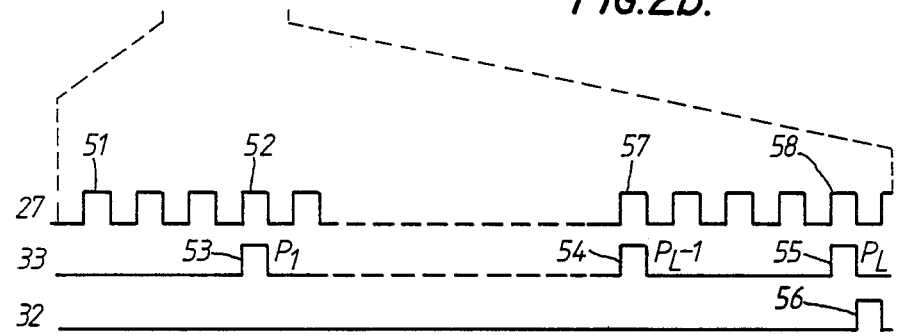

FIGS. 2a, 2b and 2c illustrate waveforms present in the apparatus of FIG. 1.

In FIG. 2a upon actuation of the foot switch 19 a signal 45 actuates the motor logic circuit 14 if the scan enable signal 46 is present on line 23 and the scan cycle is then originated causing the scan complete signal 47 on line 24 to fall. Upon completion of the scan the scan complete signal 47 returns to its high level indicating to the control computer 22 the completion of the scan.

The synchronising clock signals on line 27 shown in FIG. 2b ensures synchronisation between the clock signals 48, the image data 49 on line 33 which is fed to the computer, the end of line signals 50 on line 32 also fed to the computer and the rate at which the computer 22 itself accepts the digital pixel data 49 on line 33.

FIG. 2c is an enlargement of the interval between two end of line signals 50 and shows the synchronising clock pulses 48 in more detail. Image data is represented as pixels P1 to $P_L$ and the image data output pixels are coincident with every fourth synchronising clock pulse indicated at 51, 52 . . . 57, 58. The first pixel P1 is coincident with the clock pulse 52. The second to last pixel $P_L$-1 is shown coincident with a clock pulse 57 and the last pixel $P_L$ is shown coincident with a clock pulse 58. The end of line signal 56 on line 32 occurs shortly after the last pixel has been transferred via the processor 31 to the computer 22.

A typical pattern cam or template is shown in FIG. 4. This pattern 2 is a flat plate which can rest on the support graticule 1 and whose peripheral shape 59 delineates exactly the required peripheral shape of an ophthalmic lens to be ground by the lens periphery grinder.

An axis reference may be determined by the control computer 21 by extrapolating a line 60 through axis locator pin holes 61 and a centre hole 62.

FIG. 5 illustrates diagrammatically a conventional lens periphery grinder 70 in which the peripheral shape of an ophthalmic lens blank 71 is ground by a grinding wheel 72. The relative positioning of the lens blank 71 and the grinding wheel 72 is controlled by the present invention in accordance with stored pattern data in the control computer 22, the appropriate pattern data being selected by the operator. A motor 73 is controlled by an amplifier 74 and the motor 73 controls the physical position of the edger head by the transfer of mechanical motion indicated at 75 through a gear set 76 to the existing size adjustment mechanism of the lens periphery grinder as indicated by line 77.

A position resolver 78 is coupled, as indicated at 79, to the gear set 76 and the position resolver 78 therefore serves to provide a feedback voltage on line 80 to a summer 81. This feedback voltage on line 80 is proportional to the relative positioning of the edger head.

The amplifier 74 receives a command signal on line 82 from the summer 81. This command signal is the result of the summation by the summer 81 of the feedback voltage on line 80, a position control voltage on line 83 derived from a position control electronic switch 84 and a size offset voltage on line 85 which is generated by a manual size resolver 86 which inputs a desired manual position offset to the edger head. The size offset voltage on line 85 is also fed via a display driver 87 to a size display 88 which displays the selected size offset for viewing by the operator.

The amplifier 74, the motor 73, the gear set 76, the position resolver 78 and the summer 81 create a closed loop servo-positioning system. Any change in the manual size offset voltage on line 85 to the summer 10 or in the position control voltage on line 83 will cause a proportional change in the physical position of the edger head.

The position control voltage on line 83 originates from a sample and hold circuit 89 which may be connected to or disconnected from the summer 10 by the electronic switch 84. The electronic switch 84 is controlled by a line 90 which originates from an auto/manual mode select circuit 91.

The sample and hold circuit 89 holds and generates the position control voltage fed to the switch 84 under control of a position control input signal from a data line 92 through bus switches 93 and a line 89a.

A new position control input signal can only be acquired by the sample and hold circuit 89 from the data line 92 through the bus switches 93 when the bus switches 93 are enabled by a signal on line 94 from an address counter and decoder 95, thus allowing data line access and enabling the sample and hold circuit 89, thereby sampling a new position control input signal on line 89a and thereby holding and generating a position and control voltage output from the sample and hold circuit to the switch 84.

A new position control voltage on line 83 can therefore be generated at a rate equivalent to the enable signal on line 94 from the address counter and decoder 95. The closed loop servo-positioning section, including the motor 73, will then cause the edger head to assume a new physical position in accordance with the new position control voltage on line 83. The limitation on the speed of assumption of a new physical position of the edger head being determined by the enable signal on line 94. By causing that enable signal on line 94 to occur at a rate great enough to ensure that the physical step sizes of the edger head are within the desired practical accuracy limitations, it will be apparent that a multiplexed system for the distribution of position control signals on the data line 91 has been created. This data line 91 therefore serves to provide position control signals to one or more edger retrofit systems connected to existing lens periphery grinders.

The address counter and decoder 95 provides address decoding by counting clock pulses present on line 96 in conjuction with reset pulses provided on line 97 for synchronisation purposes, and comparing the pulse count with a desired system address on line 98 generated by an address select circuit 99, thereby causing the enable signal on line 94 to be generated whenever there is an address match.

FIG. 5 also illustrates an axis resolver system. A connection from the lens axis mechanism is indicated at 100 which is connected to an axis resolver 101 which generates an axis position signal on line 102 representative of the axis position of the edger. The line 102 is connected to an axis resolver circuit 103 which conditions the axis position signal on line 102 as necessary, and feeds a conditioned axis position signal on line 104 to the bus switches 93. Thus a signal representative of the axis position of the edger will be connected to a data line 105 whenever the bus switches 93 are enabled by line 94.

A bar code reader 106 generates data signals on a line 107 which are fed to a bar code reader circuit 108 for appropriate conditioning and are then fed on a line 109 to the bus switches 93 for connection to a data line 110 when bus switches are enabled by an enabling signal on line 94. A status indicator 111 is driven via line 112 by a prompt/status circuit 113 which also drives an audible transducer 114 via line 115. The prompt/status circuit 113 receives data signals on a line 116 through bus switches 93 from a data line 117.

A bus and communications monitoring circuit 118 which serves to monitor the rate of the enabling signal on line 94, also receives data on line 116 and provides for status monitoring and false detection, status and fault data being transmitted on line 119 to the prompt/status circuit 113.

The auto/manual mode select circuit 91 is operable via line 90 to disable access to the communications bus connected to the control computer 22 through the bus switches 93 and at the same time disconnects the position command voltage on line 83 from the summer 81 thereby allowing complete manual operation because the only position control input to the system would then be the manual size offset voltage on line 85.

The positioning control apparatus of FIG. 5 therefore provides a servo-positioning retrofit which can be easily attached to an existing lens periphery grinder and requires no electrical interconnection to an existing grinder 70, while providing for precise physical positioning of the edger head in accordance with the axis position of the edger.

Further this arrangement provides a multiplexing means which allows a number of such retrofit systems to share a number of data lines from the central control computer 22 which data lines allow the interchange of all necessary data bidirectionally and allows the computer 22 to perform the appropriate calculations and information processing. The speed and accuracy of the control computer is the limiting factor on the number of retrofits which may be multiplexed and the accuracy which they may achieve.

In actual operation of the present invention the bar code reader 106 serves to inform the control computer of various design functions, most importantly of the desired peripheral lens shape to be ground. The control computer thereafter processes the axis position signal to calculate the appropriate position control in accordance with the desired job identification and then places that position control signal on one of the data lines. The control computer can also control various functions and status indicators through data on one of the data lines. Further the control computer repeats this process for any number of retrofit systems in a sequential manner by stepping through various desired addresses, thereby accomplishing multiplex distribution and control of the retrofit systems.

While the present invention has been described in connection with a preferred specific embodiment thereof, it will be understood that this description is intended to illustrate and not limit the scope of the invention and it will also be apparent that changes may be made in the construction and arrangement of the various components of the present invention without departing from its scope as hereinafter claimed:

1. Apparatus for the production of an ophthalmic lens by positional control of the edge grinding of a lens, comprising:
   means for supporting a pattern which delineates the peripheral shape of an ophthalmic lens;
   a linear image sensor mounted for rotation about an axis passing through said supporting means; and
   a control computer connected to said sensor to process and store pixel data generated by said rotating sensor for selective control of a lens periphery grinder.

2. Apparatus for the edge grinding of an ophthalmic lens comprising:
   a support for a pattern cam which represents the peripheral shape of an ophthalmic lens;
   means for illuminating said support;
   a linear image sensor mounted for rotation about an axis passing through said support;
   means for rotating said sensor about said axis;
   an optical system between said support and said sensor for producing an image of said pattern cam for scanning by said sensor; and
   control computer means connected to said means for rotating said sensor, which control computer means is connected to said sensor and is operable to process and store pixel data generated by said rotating sensor for selective control of an ophthalmic lens periphery grinder.

3. Apparatus as claimed in claim 2, wherein:
   said linear image sensor is a charge coupled device (CCD) linear image sensor which senses an optical slice of said image;
   said means for rotating said sensor comprises a motor;
   a position resolver is connected to said motor for rotation with said sensor;
   a motor logic circuit is connected to said position resolver and to said control computer means, and has a control output connected to said motor; and
   a master clock output from said control computer means is connected to said linear image sensor to synchronise scanning of a slice of said image with rotation of said motor.

4. Apparatus as claimed in claim 3, including a digitizer circuit connected to said linear image sensor to digitize analog pixel data from said sensor and to transmit that data in digital form for storage in said control computer means in synchronism with said master clock.

5. Apparatus as claimed in claim 4, wherein said digitizer is operable to transmit to said control computer means a signal indicative of the end of a line scan.

6. Apparatus as claimed in any one of claims 3 to 5, wherein said motor logic circuit is operable to transmit to said control computer means a signal indicative of the end of a scanning cycle.

7. Apparatus as claimed in any one of claims 3 to 5, including a cycle initiator connected to said motor logic circuit and operable to initiate a scanning cycle.

8. Apparatus for the edge grinding of an ophthalmic lens to a desired peripheral shape, comprising:
   a lens periphery grinder including a sensing device for sensing the position of a lens edge relative to grinding means and for producing an actual position signal; and
   means responsive to a positioning signal from control computer means to determine the relative position of said lens and said grinding means; and said control computer means including a comparator operable to compare said actual position signal with stored data generated by sensing a pattern which delineates the desired peripheral shape of the lens, and to produce said positioning signal for transmission to said lens periphery grinder.

9. Apparatus as claimed in claim 8, including a manually operable size adjustor for actuation by an operator of said lens periphery grinder.

10. Apparatus as claimed in claim 8, wherein said control computer means is operable to control a number of specific operational modes of said lens periphery grinder.

11. Apparatus as claimed in any one of claims 8 to 10, wherein said control computer means is connected in multiplexed manner to control circuits of a number of lens periphery grinders.

12. Apparatus for the edge grinding of an ophthalmic lens to a desired peripheral shape, comprising:

a support for a pattern representing the peripheral shape of a lens;

a linear image sensor mounted for rotation about an axis passing through said support;

control computer means connected to said sensor to process and store pixel data generated by said rotating sensor; and means connected to said control computer means for sensing the position of a lens edge relative to grinding means of a lens periphery grinder, and for producing an actual position signal;

said control means including comparator means operable to compare said stored pixel data with said actual position signal and to produce a positioning signal; and said lens edge grinder including means responsive to said positioning signal to determine the relative position of a lens to be ground and said grinding means.

* * * * *